United States Patent [19]
Assaf et al.

[11] Patent Number: 5,755,102
[45] Date of Patent: May 26, 1998

[54] METHOD OF AND MEANS FOR PRODUCING POWER USING CONCENTRATED BRINE

[75] Inventors: Gad Assaf, Rehovot; Lucien Y. Bronicki, Yavne; Uriyel Fisher, Haifa, all of Israel

[73] Assignee: Ormat Industries Ltd, Yavne, Israel

[21] Appl. No.: 608,275

[22] Filed: Feb. 22, 1996

Related U.S. Application Data

[63] Continuation of Ser. No. 276,595, Jul. 18, 1994, abandoned, which is a continuation of Ser. No. 950,279, Sep. 24, 1992, abandoned, which is a continuation-in-part of Ser. No. 945,875, Sep. 17, 1992, abandoned.

[51] Int. Cl.$^6$ ............................................. F03G 7/00
[52] U.S. Cl. ......................... 60/641.8; 60/652; 126/561
[58] Field of Search .......................... 60/688, 689, 673, 60/641.8, 641.9, 652, 649; 126/561, 567

[56] References Cited

U.S. PATENT DOCUMENTS

| | | |
|---|---|---|
| 3,996,749 | 12/1976 | Denis et al. .................. 60/652 |
| 4,498,300 | 2/1985 | Assaf et al. .................. 60/641.8 |
| 4,583,370 | 4/1986 | Assaf . | |
| 4,617,800 | 10/1986 | Assaf . | |
| 4,704,189 | 11/1987 | Assaf . | |
| 4,704,993 | 11/1987 | Assaf . | |
| 4,894,993 | 1/1990 | Assaf et al. .................. 60/641.8 |

OTHER PUBLICATIONS

G. Assaf and U. Fisher, The Arava Valley as a Source of May 18–19, 1992, Manuscript 35.14.

*Primary Examiner*—John T. Kwon
*Attorney, Agent, or Firm*—Donald M. Sandler

[57] ABSTRACT

A hygroscopic power plant utilizes low salinity liquid (e.g., sea water having a salinity of about 4%) and a source of high salinity liquid (e.g., brine having a salinity of about 38%) for generating electricity. The plant includes a flash chamber to which liquid is supplied and within which water in the liquid is flashed into steam producing more concentrated liquid. A steam turbine is responsive to the steam for generating electricity and producing heat depleted steam. A condenser is provided to which high salinity liquid and the heat depleted steam are supplied for directly contacting the steam with the high salinity liquid whereby the steam condenses on the liquid producing diluted high salinity liquid. A regenerator is provided for evaporating water from the diluted high salinity liquid to produce the high salinity liquid supplied to the condenser. Apparatus is provided for combining the low sea water liquid with the concentrated liquid produced by the flash chamber to form the liquid supplied to the flash chamber.

26 Claims, 3 Drawing Sheets

METHOD OF AND MEANS FOR PRODUCING POWER USING CONCENTRATED BRINE

This application is a continuation of application Ser. No. 276,595 filed Jul. 18, 1994 (now abandoned), which is a continuation of application Ser. No. 950,279 filed Sep. 24, 1992 (now abandoned), which is a continuation-in-part of application Ser. No. 945,875 filed Sep. 17, 1992 (now abandoned).

BACKGROUND OF THE INVENTION

1. Technical Field

This invention relates to a method of and apparatus for producing power using concentrated brine.

2. Background of the Invention

U.S. Pat. No. 4,583,370, U.S. Pat. No. 4,617,800, U.S. Pat. No. 4,704,993, the disclosures of which are hereby incorporated by reference, each disclose hygroscopic power plants in which water is flashed into steam which drives a turbo-generator that produces electricity. The steam exhausted by the turbine is directly contacted with hygroscopic brine causing condensation of the steam on the brine, the heat of condensation being adsorbed by the brine and then returned to the water entering the flash chamber. This seemly perpetual motion operation winds down as the brine for the condenser is diluted by the condensation of the steam.

U.S. Pat. No. 4,704,189 (the disclosure of which is hereby incorporated by reference) discloses an enhanced evaporation system that consumes almost no energy. Such enhanced evaporation system is ideal in the desert and arid environments of the type typically found in Africa, the Middle East, as well as in the western United States. In these regions, the enhanced evaporation system of the '189 patent would provide an ideal brine regenerator for a hygroscopic power plant.

One of the problems with a conventional hygroscopic power plant lies in the expense and complexity of direct contact condensers into which steam from the turbine exhausts. The '800 and the '993 patents, identified above, employ a thin film of concentrated brine flowing on the outer surface of a dome-shaped structure, and a thin film of cooling water flowing on the inner surface. The exhaust steam directly contacts the brine and is condensed, the brine absorbing the heat of condensation which is transferred to the cooling water. While this technique efficiently transfers heat, it is complicated and costly to construct and maintain.

It is therefore an object the present invention to provide a new and improved hygroscopic power plant which is less expensive to build and maintain, and which provides basis for a new power generation system.

DETAILED DESCRIPTION OF THE INVENTION

The present invention provides a hygroscopic power plant utilizing a source of low salinity liquid (e.g., sea water having a salinity of about 4%) and a source of high salinity liquid (e.g., concentrated brine having a salinity of about 38%) for generating electricity. The power plant includes a flash chamber containing brine of intermediate salinity which is flashed into steam producing more concentrated brine. A steam turbine is responsive to the steam for generating electricity and producing heat depleted steam which is applied to a condenser to which the high salinity liquid is supplied. The steam and liquid of high salinity are in direct contact such that the steam condenses on the liquid producing diluted high salinity liquid (e.g., brine having a salinity of about 33%). A regenerator evaporates water from the diluted high salinity liquid to produce the high salinity liquid supplied to the condenser. The more concentrated brine produced by the flash chamber is combined with the low salinity liquid to form concentrated low salinity liquid which is supplied to the flash chamber.

Preferably, the condenser includes a first chamber having concentrated brine of a salinity close to that of the high salinity liquid thereby presenting a liquid surface to the heat depleted steam for effecting partial condensation thereof. Droplets of high salinity liquid are preferably sprayed into the second chamber for effecting final condensation of the steam. A conduit connects the first and second chambers for effecting a rapid flow of liquid in one direction from the second chamber to the first, and a rapid flow of heat depleted steam preferably in the opposite direction.

The new and improved hygroscopic power plant according to the present invention is ideally suited for use in a system for generating electricity wherein a first hygroscopic power plant is located at an elevation above a terminal lake containing liquid of said relatively high salinity. The two source liquids are applied to the first power plant which produces electricity as described above by increasing the concentration of the first liquid, and by decreasing the concentration of the second liquid. A regenerator associated with the first power plant effects evaporation of water from the diluted second liquid to produce the second liquid applied to the first power plant. Means are also provided for transferring the concentrated first liquid produced by said first power plant through an hydraulic turbine located at the terminal lake for producing electricity. The liquid that passes through the hydraulic turbine is stored in the terminal lake above the liquid of relatively high salinity.

BRIEF DESCRIPTION OF THE DRAWINGS

Embodiments of the present invention are shown by way of example in the accompanying drawings wherein.

DETAILED DESCRIPTION

Figure 1:
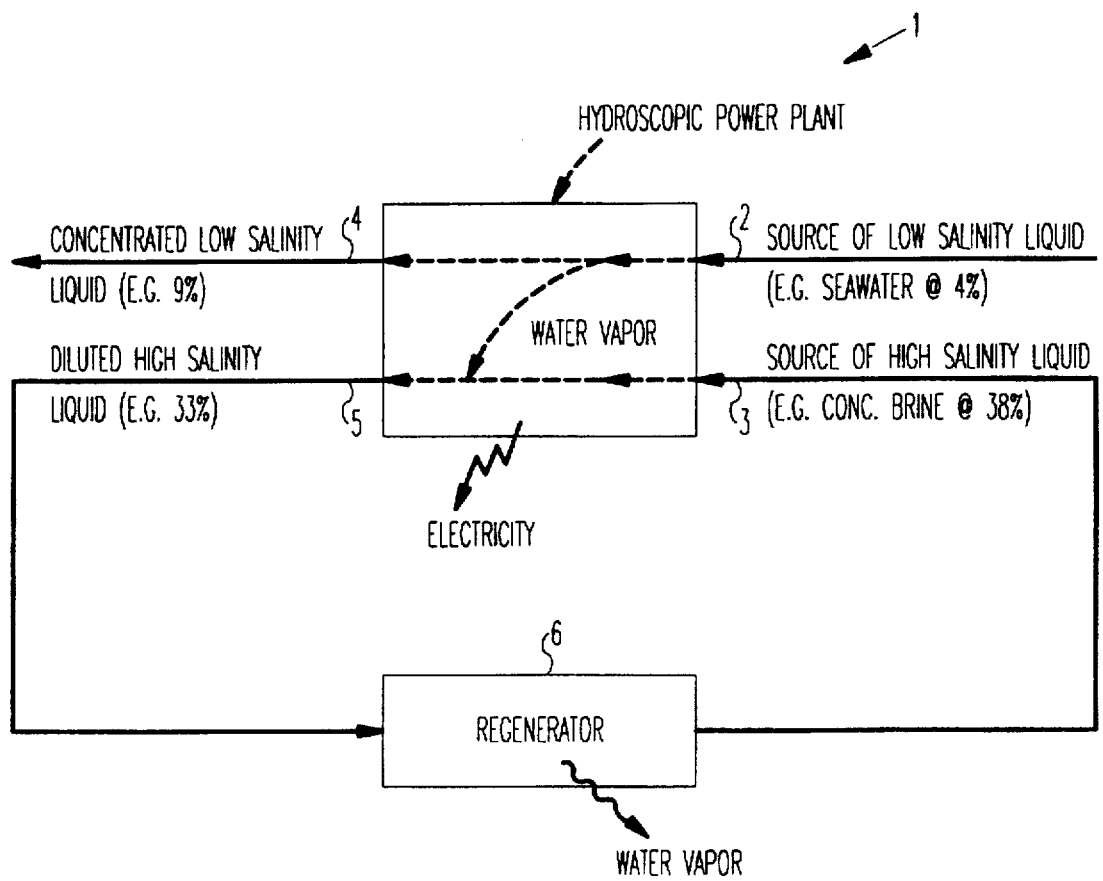
FIG. 1 is a block diagram of a hygroscopic power plant according to the present invention illustrating its general mode of operation.

Referring now to the drawings, reference numeral 1 represents a hygroscopic power plant according to the present invention for producing electricity from two source liquids 2, 3: a low salinity liquid (e.g., sea water at about 4% salinity), and a high salinity liquid (e.g., concentrated brine at about 38% salinity). These two sources must be available to sustain the operation of the plant. Such sources exist whenever water or brackish water flows into a terminal lake such as the Salton Sea, and the Great Salt Lake in the western United States, the Dead Sea in Israel, and elsewhere throughout the world.

As detailed below, the hygroscopic power plant operates on the two source liquids by effecting a transfer of water in the form of steam from the low salinity liquid, thereby producing at 4 concentrated low salinity liquid which must be disposed of. The steam is applied to a turbo-generator (not shown) wherein energy is extracted from the steam to drive a generator that produces electricity. The steam is condensed by direct contact with the high salinity liquid producing high salinity liquid at 5.

The diluted high salinity liquid is regenerated by regenerator 6 whereby the water vapor extracted from the low salinity liquid is removed and preferably returned to the ambient atmosphere. The resultant high salinity liquid is then returned to the power plant and the cycle continues.

As used in this disclosure, the terms "brine", and "concentrated brine" when used in connection with the low salinity liquid as it is processed in the power plant means brine of a salinity greater than the salinity of the low salinity liquid, but considerably less than the salinity of the both the high salinity liquid and the diluted high salinity liquid. On the other hand, these terms used in connection with the high salinity liquid as it is processed in the power plant means brine with a salinity intermediate the salinity of the high salinity liquid and that of the diluted high salinity liquid. With these definitions in mind, reference is made to FIG. 2 wherein reference numeral 10 designates a hygroscopic power plant according to the present invention utilizing two source liquids: a first liquid of relatively low salinity, and a second liquid having relatively high salinity. As indicated in FIG. 1, the first liquid may be sea water with a salinity of about 4%, and the second liquid may be concentrated brine with a salinity of about 38%. However, as indicated previously, the relatively low salinity liquid could be water from an ocean, a lake, or a river. Alternately, the liquid could be waste water from an industrial process, or agricultural waste water, or water from other processes.

The power plant is responsive to the application of the two source liquids for producing electricity by concentrating the first liquid to form more concentrated liquid, and by diluting the second liquid to form a diluted concentrated liquid. As indicated in the drawings, the first source liquid is concentrated from a salinity of about 4% to a salinity of about 9% and is then disposed of. If the low salinity liquid is sea water, the more concentrated low salinity water may be disposed of into the source of the sea water.

The second source liquid is diluted from a salinity of about 38% to a salinity of about 33%. The operation of the power plant is sustained by reconcentrating the diluted concentrated liquid back to a salinity of about 38% by an enhanced evaporation system described below.

Power plant 10 includes flash chamber 11 having inlet 12 through which brine is supplied. Brine 13 contained in the flash chamber is flashed into steam which exits the flash chamber at 14 and it is piped to steam turbine 15 wherein expansion takes place driving generator 16 which produces electricity. The brine remaining in the flash chamber becomes more concentrated as a result of the flashing operation.

Heat depleted steam is exhausted from turbine 15 through exhaust line 17 and enters first chamber 18 of condenser 19. First chamber 18 is connected to second chamber 20 by way of conduit 21 that effects a rapid flow of liquid 24 from the second chamber to the first chamber, and the rapid flow of heat depleted steam in the opposite direction. However, in an alternative arrangement, the heat depleted steam may flow in the same direction as the liquid in conduit 21.

Spray head 22 is preferably located in chamber 20, but alternatively may be located in chamber 18. The spray head is supplied with the second source of liquid in the form of concentrated brine whose salinity is about 38% and produces sprays of droplets of the concentrated brine in chamber 20. The brine droplets interact with the heat depleted steam and eventually fall to liquid surface 23 of concentrated brine 24 contained in chamber 20. In the manner described below, each of chambers 18 and 20 is partially filled with concentrated brine which flows from chamber 20 to chamber 18 through conduit 21. The upper surface 23 of the brine in condenser 19 presents to the heat depleted steam a liquid surface on which the heat depleted steam can condense. The flow of concentrated brine from chamber to chamber through the conduit presents to the heat depleted steam a turbulent renewed liquid surface for enhancing condensation. Specifically, the conduit has a smaller cross-sectional area than the chambers, and the flow of liquid through conduit is relatively rapid; but the flow of heat depleted steam is more rapid, and preferably oppositely directed in counterflow arrangement. The preferred arrangement is for the liquid to flow at about 0.5 meters per second, and the heat depleted steam to flow at an average rate no less than about 5 meters per second in the opposite direction.

Alternatively, or in addition, in order to enhance the interaction between the steam and the brine in the condenser, mechanical agitation of the brine may be provided. As a further alternative, or further in addition, a vertically movable, partially submerged brush may be provided in the condenser for alternatively bringing concentrated brine into contact with the steam, and returning diluted brine to the liquid surface. Here, in the alternative scheme, the condenser would comprise a chamber having a mechanical agitator for vertically oscillating submerged brushes above and below the surface.

Figure 2:
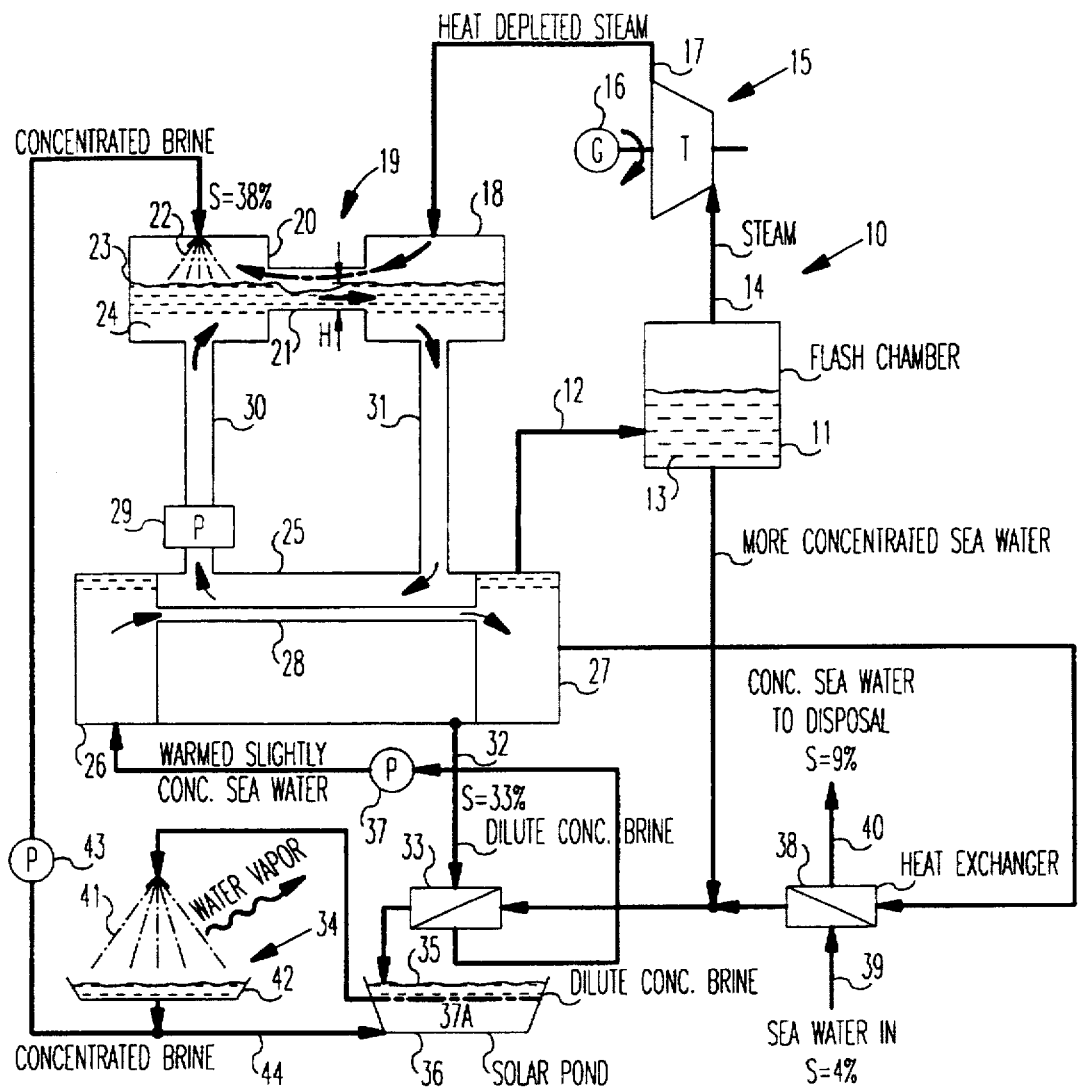
FIG. 2 shows a hygroscopic power plant according to the present invention.

The concentrated brine in the two chambers of the condenser is exchanged with brine contained in heat exchanger 25 which is an indirect heat exchanger having headers 26 and 27 at opposite axial ends. These headers are interconnected by a plurality of tubes 28, only one of which is shown in FIG. 2. Vertical conduit 30 connected to chamber 20, and to heat exchanger 25, and vertical conduit 31 connected to chamber 18 and to heat exchanger 25, permit pump 29 to exchange brine between the chambers and the heat exchanger. This circulation provides the desired relative flow between the liquid in conduit 21 and the steam.

In the operation of condenser 19, heat depleted steam exhausted from turbine 15 enters chamber 18 and interacts with liquid surface 23 of the concentrated brine in the chamber. This initial contact causes condensation of some of the heat depleted steam onto surface 23. However, the flow pattern established by pump 29 quickly removes the somewhat diluted brine from the surface replacing it with more concentrated brine.

The remaining heat depleted steam counterflows through conduit 21 and interacts with surface 23 of the concentrated brine, and more condensation takes place. Final condensation of the heat depleted steam takes place within chamber 20 by way of interaction of the steam with the droplets of concentrated brine scavaging any uncondensed heat depleted steam from the chamber.

As a consequence of this arrangement, the heat of condensation contained in the heat depleted steam is transferred to the concentrated brine. The condensate reduces the concentration of the brine somewhat below the level of the concentrated brine sprayed into the condenser.

The volume of liquid in condenser 19 will tend to increase by reason of the condensation of heat depleted steam on brine in the condenser, and the addition of concentrated brine through spray head 22. To maintain the liquid volume and a constant surface level 23 within the chambers, an amount of diluted concentrated brine is extracted at outlet 32 and applied, preferably, to closed contact heat exchanger 33 where heat is extracted before the diluted concentrated brine is temporarily stored. In the embodiment shown in FIG. 2, the diluted concentrated brine is stored as the surface layer of solar pond 36 whose lower portion contains the high salinity liquid in the form of concentrated brine of a salinity of about 38%.

Entering the other side of heat exchanger 33 is a combination of the low salinity liquid in the form of sea water which may have a salinity of about 4% and brine extracted from flash chamber 11 in order to maintain the level of concentration of liquid therein. This concentrated low salinity liquid in the form of concentrated sea water preferably absorbs heat from the diluted concentrated brine before the latter is stored in solar pond 36. The concentrated low salinity liquid, after absorbing heat, is pumped by pump 37 into header 26 of heat exchanger 25. Pump 37 effects the flow of concentrated sea water into heat exchanger 25 through tubes 28 into header 27 extracting heat from the diluted concentrated brine that is circulated through chambers 18 and 20 in a manner similar to the heat transferred in evaporator-condenser heat exchanger disclosed in U.S. Pat. No. 4,617,800. The warmed concentrated sea water is then supplied to flash chamber 11 through inlet 12.

Low salinity liquid in the form of inlet sea water is supplied to heat exchanger 38 where this water is heated by exchanging heat with the concentrated sea water leaving header 27 of heat exchanger 25. The cooled concentrated sea water is then disposed of.

In order to sustain the operation described above, the diluted concentrated liquid in the form of brine of a salinity of about 33% must be regenerated to produce concentrated liquid in the form of brine of a salinity of about 38%. This can be done by using an enhanced evaporation system 34 wherein diluted concentrated liquid contained in surface layer 35 of solar pond 36 is applied to elevated spray head 41. The diluted concentrated brine is then sprayed into ambient air. Under arid conditions, and as taught in the '189 patent, most of the water in the diluted concentrated brine is evaporated under conditions of constant enthalpy in an energy-efficient manner. The resultant concentrated liquid of salinity of about 38% is collected in pond 42 and is pumped by pump 43 to spray heads 22 of chamber 20. Depending on the level of electrical output of the power plant and the ambient weather conditions, any excess concentrated liquid produced by enhanced evaporation system 34 can be transferred via conduit 44 to bottom layer 37A of solar pond 36 for elevating the temperature of the concentrated brine.

Figure 2A:
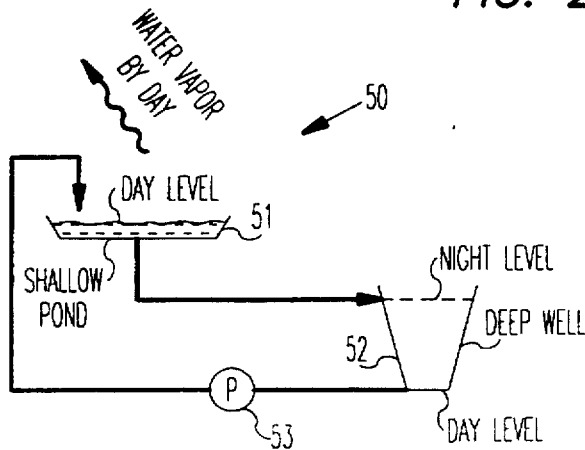
FIG. 2A shows a modification of the power plant shown in FIG. 1 in connection with the apparatus for regenerating the concentrated brine.

Instead of using the enhanced evaporation system shown in FIG. 2 to regenerate diluted concentrated liquid, very shallow conventional evaporation ponds may be used. Regenerator 50 illustrated in FIG. 2A can be used when ambient conditions permit the natural evaporation of water vapor during the day. This approach is satisfactory except that during the night, particularly in the winter, significant cooling of the diluted concentrated liquid in evaporation ponds 51 will occur by reason of the extended area in the ponds which is necessary to effect the desired water vapor evaporation during the day. To suppress the cooling of the diluted concentrated liquid during the night, relatively deep well 52 is provided having a relatively small area exposed to the ambient air. The operation is such that, during the day, shallow ponds 51 contain the diluted concentrated liquid, and concentration occurs in a natural and known manner. As nightfall occurs, the diluted concentrated liquid contained in the shallow evaporation ponds is transferred to deep well 52 thereby protecting the diluted concentrated liquid from heat loses to the ambient atmosphere. The next day, pump 53 returns the diluted concentrated liquid in the deep well to the shallow evaporation ponds. The day and night levels of the diluted concentrated liquid are indicated in FIG. 2A.

Figures 3, 3A:
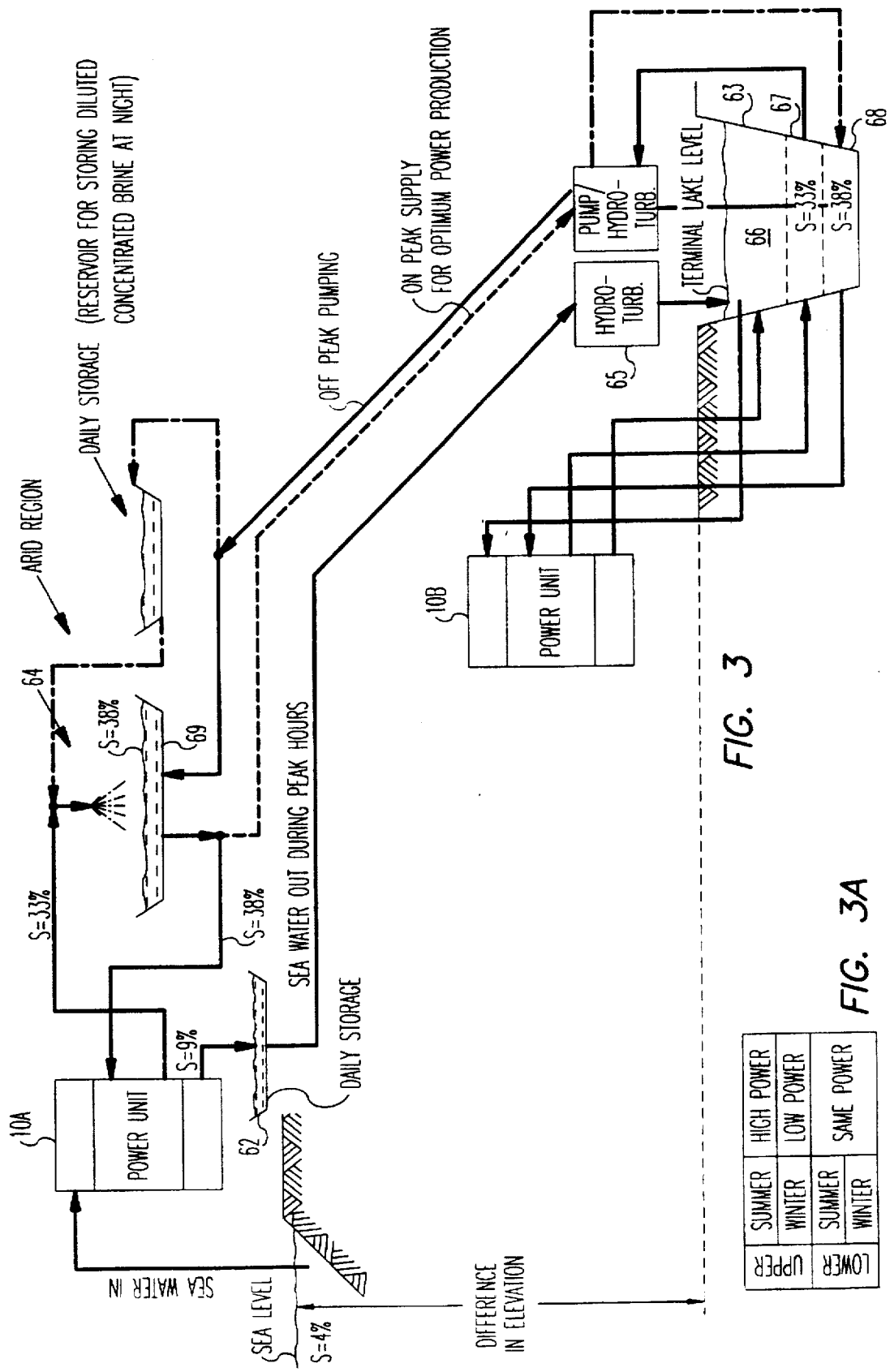
FIG. 3 is a block diagram of a system according to the present invention for generating electricity utilizing a first power plant located at an elevation above a terminal lake, and a second power plant at the terminal lake.
FIG. 3A is a chart that illustrates the operation of the apparatus shown in FIG. 3.

A hygroscopic power plant such as that illustrated in FIG. 2 is ideally suited for the power system illustrated in FIG. 3 to which reference is now made. Of course, other hygroscopic power plants, such as described in Nadav and Ophir, *Desalination*, 40 (1982), 197–211 can be used. The system illustrated in FIG. 3 utilizes two sources of liquids, one of which is of relatively low salinity and the other of which is at a relatively high salinity. As indicated in FIG. 2, the relatively low concentration source liquid is sea water having a salinity of about 4%.

The relatively high concentrated liquid in FIG. 2 has a salinity of about 38%. The liquids produced by the power plant as consequence of its generation of electricity is concentrated low salinity liquid having a salinity of about 9% and diluted concentrated liquid having a salinity of about 33%. Thus, as shown in FIG. 3, power unit 10A, which may have the constructional details shown in FIG. 2, produces electricity in accordance with the operation described above. Instead, however, of merely disposing of the concentrated low salinity liquid in the sea, the power unit shown in FIG. 3 preferably stores the concentrated sea water in reservoir 62.

In the embodiment shown in FIG. 3, power plant 10A is located at an elevation above terminal lake 63 containing relatively high salinity liquid in the bottom layer 68. The two source liquids referred to above are applied to plant 10A which produces electricity. The diluted concentrated liquid is regenerated by regeneration apparatus which evaporates water from the diluted concentrated liquid to produce the concentrated liquid needed to sustain the operation of power plant 10A. Because of peak power requirement, power plant 10A would operate day and night. For peak power, the concentrated low salinity liquid accumulated in reservoir 62 is transferred to terminal lake 63 through hydraulic turbine 65 located at the terminal lake thereby producing additional electricity. The concentrated low salinity liquid that exits turbine 65 is directed to and stored in upper layer 66 of terminal lake 63. As indicated previously, this concentrated low salinity liquid has a salinity of about 9% and is considerably lighter than the concentrated brine at the bottom of the terminal lake, and thus floats on the surface.

Second power unit 10B is located near the terminal lake and it uses the concentrated low salinity liquid in layer 66 stored in the terminal lake as well as the high salinity liquid at the bottom of the lake for producing electricity in the manner described above. Power plant 10B also produces more concentrated low salinity liquid, and diluted concentrated liquid both of which are returned to the terminal lake. The diluted high salinity liquid is stored in layer 67 intermediate top layer 66 and bottom layer 68 of the terminal lake.

During the winter, the ambient conditions may be inadequate for the regeneration apparatus to convert a sufficient amount of diluted concentrated liquid to concentrated liquid to operate the power plant at its rated output. In such case, the electrical output will be reduced. During the summer, when the demand for electricity is high, diluted high salinity liquid from intermediate layer 67 of the terminal lake is pumped from the lake to the upper power plant. This pumping operation takes place at night when the demand for electricity abates and excess power is available. During the day (i.e., during peak demand for electricity), the diluted high salinity liquid is concentrated in concentrator 64 and made available to the plant for generating electricity, and the electrical output of the sea level power plant is thus increased. During these periods of peak power, a portion of the high salinity concentrated brine stored in pond 69 at the sea level power plant is released for flow into the hydraulic turbine to additional increase the electrical output.

The essential feature of heat transfer between the low salinity liquid and the high salinity liquid described above in connection with the power plant shown in FIGS. 2 and 3 actually can be described as a chemical heat pump which elevates the temperature of the brine using heat extracted from cold, low salinity liquid. The heated brine produced can be used as a heat source in a multi-stage, or multi-effect evaporator of a desalination system, or for other purposes. Heat pumps of this nature can be used in series to raise the temperature of the sea, or low salinity liquid, permitting large amounts of fresh water to be produced. If preferred, however, power produced by a hygroscopic power plant of the type described, or other suitable types, can be used by a conventional, reverse osmosis process for producing fresh water from sea water where preferably the reverse osmosis plant feed to increase the production of the plant. Furthermore, the concentrated brine produced, can be used for conditioning the air in enclosures such as greenhouses in the vicinity of the power plant or plants.

Finally, heat exchanger 25, including the shell and headers thereof, is preferably constructed from materials that do not corrode in the presence of concentrated brines, such as coated metals, plastics, etc. Furthermore, tubes 28 of the heat exchanger are preferably constructed in accordance with the principles set forth in the '370 patent incorporated by reference. For example, tubes 28 could be formed as tubular sleeves of thermoplastic polymer such as polyolefin, where the polyolefin is selected from the group consisting essentially of polyethylene and polypropolyne. Preferably, the film from which the tubular sleeves is made should have a thickness of approximately 0.1 mm. in order to enhance the transfer of heat through the film.

The advantages and improved results furnished by the method and apparatus of the present invention are apparent from the foregoing description of the preferred embodiment of the invention. Various changes and modifications may be made without departing from the spirit and scope of the invention as described in the appended claims.

What is claimed is:

1. A hygroscopic power plant utilizing low salinity liquid and a source of high salinity liquid for generating electricity comprising:

a) a flash chamber to which liquid is supplied and within which water in the liquid is flashed into steam producing more concentrated liquid;

b) a steam turbine responsive to said steam for generating electricity and producing heat depleted steam;

c) a condenser to which said high salinity liquid and said heat depleted steam are supplied for directly contacting the steam with the high salinity liquid whereby the steam condenses on the liquid producing diluted high salinity liquid;

d) means for evaporating water from said diluted high salinity liquid to produce the high salinity liquid supplied to the condenser; and e) means for combining said low salinity liquid with the concentrated liquid produced by said flash chamber to form the liquid supplied to said flash chambers, said liquid having a salinity intermediate that of the low salinity liquid and said concentrated liquid produced by said flash chamber.

2. A hygroscopic power plant according to claim 1 wherein said condenser includes a first chamber that presents a liquid surface of high salinity liquid to said heat depleted steam for effecting partial condensation thereof, and a second chamber that presents droplets of high salinity liquid for effecting final condensation of the heat depleted steam, and a conduit connecting said first and second chambers for effecting a rapid flow of liquid in one direction, and a rapid flow of heat depleted steam in the opposite direction.

3. A hygroscopic power plant according to claim 2 wherein said condenser includes a closed contact heat exchanger having diluted high salinity liquid on one side and coolant on the other side, and a pump for exchanging diluted high salinity liquid between said closed contact heat exchanger and with the two chambers, the flow being from said second chamber through the conduit into the first chamber, means for applying said heat depleted steam to said first chamber, and means for spraying droplets of high salinity liquid from said source into said second chamber, said conduit having a cross-section smaller than the cross-section of said chambers.

4. A hygroscopic power plant according to claim 3 wherein the condenser and the pump are constructed and arranged such that the speed with which the diluted high salinity liquid flows in the conduit is less than the speed with which the heat depleted steam flows in a direction opposite the direction in which diluted high salinity liquid flows.

5. A hygroscopic power plant according to claim 4 wherein the diluted high salinity liquid flow is about 0.5 meters per second, and the heat depleted steam flows is greater than about 10 meters per second.

6. A hygroscopic power plant according to claim 1 wherein said means for evaporating water from said diluted high salinity liquid includes means for spraying the diluted high salinity liquid into ambient air and collecting high salinity liquid beneath the spray.

7. A hygroscopic power plant according to claim 1 wherein said means for evaporating water from said diluted high salinity liquid includes a relatively shallow evaporation pond having a relatively large area exposed to ambient air and containing diluted high salinity liquid during the day, and a relatively deep storage pond having a relatively small area exposed to ambient air, and containing diluted high salinity liquid during the night, and means for exchanging liquid between the ponds.

8. A hygroscopic power plant according to claim 1 including means for indirectly cooling said diluted high salinity liquid with a coolant; and means for disposing of said coolant.

9. A hygroscopic power plant according to claim 8 wherein said means for disposing includes a hydraulic turbine through which said coolant is passed.

10. A system for generating electricity utilizing a first source of low salinity liquid, and a second source liquid of high salinity liquid, said system comprising:

a) first power plant located at an elevation above a terminal lake containing relatively high salinity liquid;

b) means for applying said sources of liquids to said first power plant;

c) said first power plant being responsive to the application of said source liquids for producing electricity and for concentrating the first source liquid and for diluting the second source liquid;

d) regeneration means associated with the first power plant for evaporating water from the diluted second source liquid to increase its salinity;

e) means for transferring the concentrated first source liquid produced by said first power plant through a hydraulic turbine located at said terminal lake for producing electricity; and f) storing the liquid that passes through said hydraulic turbine in said terminal lake above the liquid of said high salinity liquid.

11. A system according to claim 10 including a second power plant located near said terminal lake for using the concentrated low salinity liquid stored and the high salinity liquid in the terminal lake for producing electricity by further concentrating the concentrated low salinity liquid, and by diluting the high salinity liquid, and means for returning the further concentrated low salinity liquid and the diluted high salinity liquid to the terminal lake.

12. The system according to claim 11 including a pump/hydraulic turbine at said terminal lake for pumping the diluted high salinity liquid from the terminal lake to a reservoir at the level of the first power plant.

13. A system according to claim 11 wherein said lake has a layer intermediate the liquid discharged by said hydraulic turbine and said high salinity liquid in the lake, said system comprising:

a) apparatus for pumping liquid from said intermediate layer of the lake to the level of the first power plant during off-peak periods of power production;

b) storage means for storing the pumped liquid;

c) means for concentrating the liquid stored in said storage means during peak periods of power production;

d) apparatus at the level of said lake for generating power in response to liquid flowing therethrough from said storage means to said lake.

14. A system according to claim 13 wherein said apparatus is constructed and arranged to operate as a pump during off-peak periods of power production, and to operate as a turbine during peak periods of power production.

15. A system according to claim 13 wherein said apparatus operates as a pump during the night and as a turbine during the day.

16. A system according to claim 11 wherein said lake has a layer intermediate the liquid discharged by said hydraulic turbine and said high salinity liquid in the lake, said system comprising:

a) apparatus for pumping liquid from said intermediate layer of the lake to the level of the first power plant;

b) storage means for storing the pumped liquid;

c) means for concentrating the liquid stored in said storage means; and c) apparatus at the level of said lake for generating power in response to liquid flowing therethrough from said storage means to said lake.

17. A system according to claim 16 wherein said apparatus is selectively operable as a pump or a turbine.

18. A method for using the system of claim 17 including the steps of operating said apparatus as a pump during the night and a turbine during the day.

19. A method for generating electricity comprising:

a) producing electricity using a hygroscopic power plant that utilizes a low salinity liquid, and a high salinity liquid for producing concentrated low salinity liquid and diluted high salinity liquid;

b) concentrating the diluted high salinity liquid by evaporating water therefrom; and c) passing the concentrated low salinity liquid from said power plant through an hydraulic turbine at an elevation lower than said power plant.

20. A method according to claim 19 including using the concentrated diluted high salinity liquid as said high salinity liquid in said power plant.

21. A hygroscopic power plant utilizing a relatively salinity liquid and a relatively high salinity liquid for generating electricity comprising:

a) a flash chamber to which liquid is supplied and within which water in the liquid is flashed into steam producing more concentrated liquid;

b) a steam turbine responsive to said steam for generating electricity and producing heat depleted steam;

c) a condenser to which said high salinity liquid and said heat depleted steam are supplied for directly contacting the steam with the high salinity liquid whereby the steam condenses on the liquid producing diluted high salinity liquid;

d) said condenser including a first chamber that presents a liquid surface of high salinity liquid to said heat depleted steam for effecting partial condensation thereof, and a second chamber that presents droplets of high salinity liquid for effecting final condensation of the heat depleted steam, and a conduit connecting said first and second chambers for effecting a rapid flow of liquid in one direction, and a rapid flow of heat depleted steam in the opposite direction;

e) an evaporator for evaporating water from said diluted high salinity liquid to produce the high salinity liquid supplied to the condenser; and f) means for combining said low salinity liquid with the concentrated liquid produced by said flash chamber to form the liquid supplied to said flash chamber.

22. A hygroscopic power plant according to claim 21 wherein said condenser includes an indirect contact heat exchanger having diluted high salinity liquid on one side and coolant on the other side, and a pump for exchanging diluted high salinity liquid between said indirect contact heat exchanger and with the two chambers, the flow of liquid being from said second chamber through the conduit into the first chamber, means for applying said heat depleted steam to said first chamber, and a sprayer for spraying droplets of high salinity liquid from said evaporator into said second chamber, said conduit having a cross-section smaller than the cross-section of said chambers.

23. A hygroscopic power plant according to claim 22 wherein the condenser and the pump are constructed and arranged such that the speed with which the diluted high salinity liquid flows in the conduit is less than the speed with which the heat depleted steam flows in a direction opposite the direction of diluted high salinity liquid flow.

24. A hygroscopic power plant according to claim 23 wherein the diluted high salinity liquid flow is about 0.5 meters per second, and the heat depleted steam flow is greater than about 10 meters per second.

25. A hygroscopic power plant utilizing low salinity liquid and a source of high salinity liquid for generating electricity comprising:

a) a flash chamber to which liquid is supplied and within which water in the liquid is flashed into steam producing more concentrated liquid;

b) a steam turbine responsive to said steam for generating electricity and producing heat depleted steam;

c) a condenser to which said high salinity liquid and said heat depleted steam are supplied for directly contacting the steam with the high salinity liquid whereby the steam condenses on the liquid producing diluted high salinity liquid;

d) means for evaporating water from said diluted high salinity liquid to produce the high salinity liquid supplied to the condenser, wherein said means for evaporating water includes a relatively shallow evaporation pond having a relatively large area exposed to ambient air and containing diluted high salinity liquid during the day, and a relatively deep storage pond having a relatively small area exposed to ambient air, and containing diluted high salinity liquid during the night, and means for exchanging liquid between the evaporation pond and the storage pond; and e) means for combining said low salinity liquid with the concentrated liquid produced by said flash chamber to form the liquid supplied to said flash chamber.

26. A hygroscopic power plant utilizing low salinity liquid and a source of high salinity liquid for generating electricity comprising:

a) a flash chamber to which liquid is supplied and within which water in the liquid is flashed into steam producing more concentrated liquid;

b) a steam turbine responsive to said steam for generating electricity and producing heat depleted steam;

c) a condenser to which said high salinity liquid and said heat depleted steam are supplied for directly contacting the steam with the high salinity liquid whereby the steam condenses on the liquid producing diluted high salinity liquid;

d) means for evaporating water from said diluted high salinity liquid to produce the high salinity liquid supplied to the condenser;

e) means for combining said low salinity liquid with the concentrated liquid produced by said flash chamber to form the liquid supplied to said flash chamber;

f) means for indirectly cooling said diluted high salinity liquid with a coolant; and g) means for disposing of said coolant including a hydraulic turbine through which sa id coolant is passed.

* * * * *